United States Patent [19]

Fukushima et al.

[11] Patent Number: 4,495,579

[45] Date of Patent: Jan. 22, 1985

[54] ACTUATOR CONTROL SYSTEM FOR AN ENGINE IDLING SPEED GOVERNOR

[75] Inventors: Tatsuhisa Fukushima, Tama; Yoshiaki Kasai, Kiyose; Mitsuo Nakamura, Tokyo, all of Japan

[73] Assignee: Fuji Jukogyo Kabushiki Kaisha, Tokyo, Japan

[21] Appl. No.: 334,059

[22] Filed: Dec. 23, 1981

[30] Foreign Application Priority Data

Dec. 27, 1980 [JP] Japan ............................ 55-187179

[51] Int. Cl.[3] ...................... G05D 13/02; F02M 3/00; F02D 31/00

[52] U.S. Cl. ............................ 364/431.07; 123/339; 123/352

[58] Field of Search ............... 364/424, 426, 427, 565, 364/566, 431.03, 431.07, 431.09; 123/339, 352

[56] References Cited

U.S. PATENT DOCUMENTS

| | | | |
|---|---|---|---|
| 3,969,614 | 7/1976 | Moyer | 235/150.21 |
| 4,163,282 | 7/1979 | Yamada | 364/431 |
| 4,232,372 | 11/1980 | Berent | 364/426 |
| 4,245,599 | 1/1981 | DesLauriers | 123/353 |
| 4,312,038 | 1/1982 | Imai et al. | 364/431.09 |
| 4,337,512 | 6/1982 | Furuhashi | 364/431.09 |
| 4,354,467 | 10/1982 | Noddings et al. | 364/424 |
| 4,392,468 | 7/1983 | Kobashi et al. | 123/339 |
| 4,394,739 | 7/1983 | Suzuki et al. | 364/565 |
| 4,402,376 | 9/1983 | Hayashi et al. | 364/426 |
| 4,418,666 | 12/1983 | Yamauchi et al. | 123/339 |

*Primary Examiner*—Eddie P. Chan
*Assistant Examiner*—Daniel K. Dorsey
*Attorney, Agent, or Firm*—Martin A. Farber

[57] ABSTRACT

An actuator control system for an internal combustion engine idling speed governor mounted on a vehicle includes an actuator for actuating a throttle valve, an ignition switch for producing an ignition turning off signal, an engine speed signal generating circuit, an engine speed increasing signal generating circuit, an engine speed decreasing signal generating circuit, an actuator control circuit for operating the actuator in opposite direction in accordance with engine speed increasing and decreasing signals. A time lag signal generating circuit is provided to be responsive to said ignition turning off signal to generate a signal after a predetermined time. A logic gate is provided to be responsive to the ignition turning off signal for operating the actuator control circuit so as to close the throttle valve from the idling open position to the closed position. Another logic gate is provided to be responsive to the time lag signal for operating the actuator control circuit so as to open the throttle valve from the closed position to the idling open position.

5 Claims, 11 Drawing Figures

FIG. 1
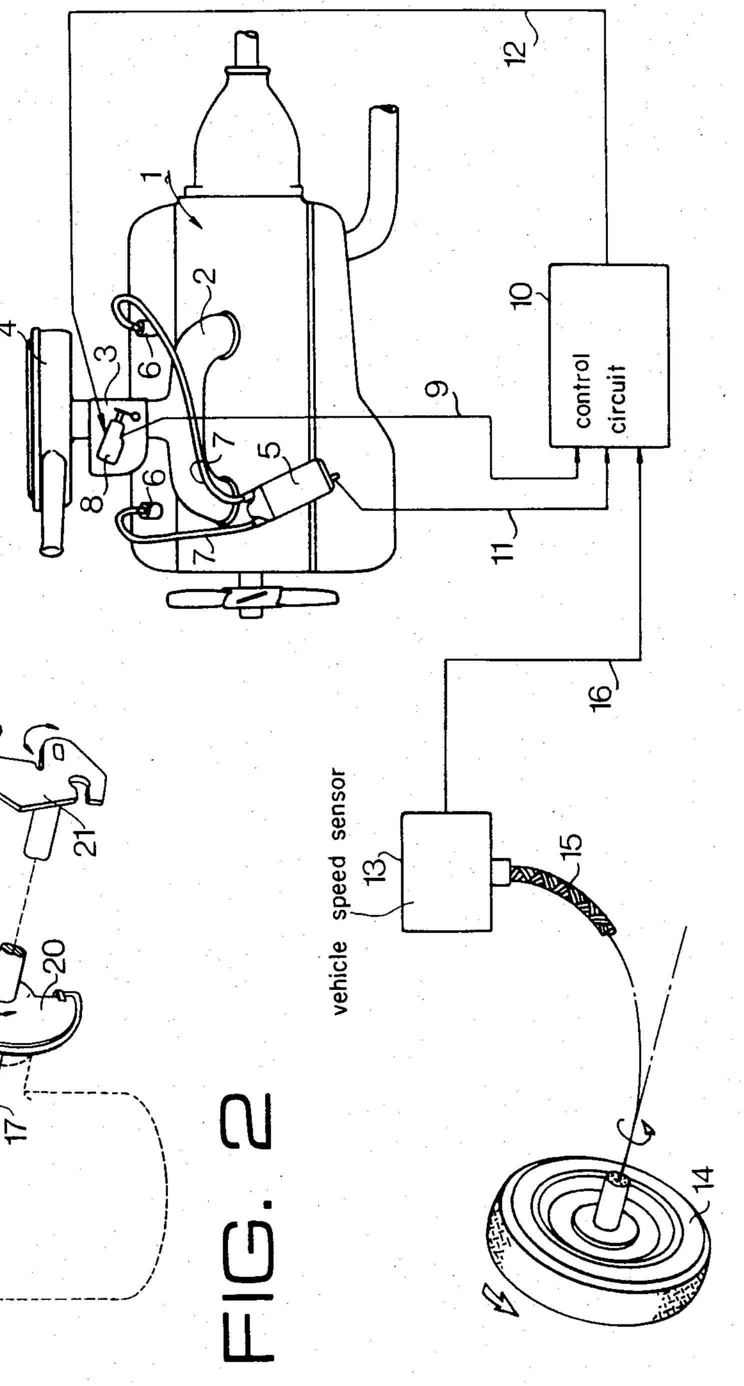
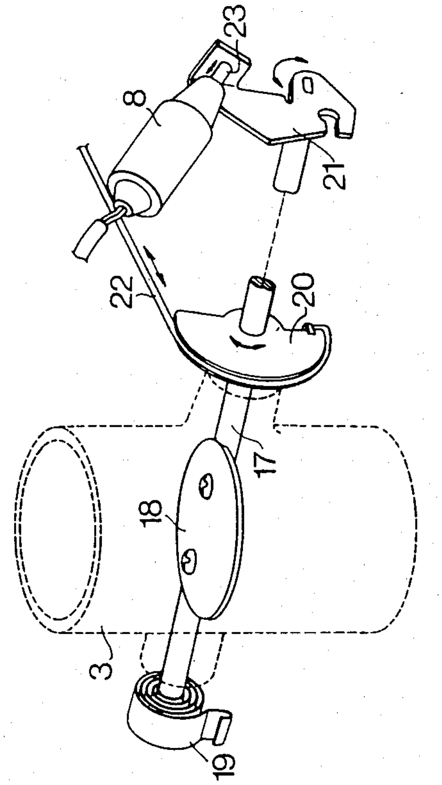
FIG. 2

ACTUATOR CONTROL SYSTEM FOR AN ENGINE IDLING SPEED GOVERNOR

BACKGROUND OF THE INVENTION

The present invention relates to a system for an actuator for controlling engine idling speed for a vehicle, and more particularly to a system which is provided with a device for preventing the malfunction of the engine when the actuator does not work.

Heretofore, a closed loop feedback control system has been provided for controlling the idling speed to a desired idling speed by adjusting the amount of air or the amount of the air-fuel mixture to be induced in the engine in dependency on the error signal which is the difference between a desired reference idling speed and the detected idling speed.

On the other hand, it occasionally happens that the engine runs on even if the ignition switch is turned off. In order to prevent the running on of the engine operation, there has been proposed a system using an actuator in the above described automatic idling speed control system. The actuator comprises a motor and an axially movable rod driven by the motor. In the system, the throttle valve follows the retraction of the rod of the actuator to close the induction passage of the engine. When the ignition switch is turned off, the rod of the actuator is further retracted, so that the throttle valve rotates from the idling open position to a further closed position to stop the engine running.

In such a system, if the actuator does not work by an accident, such as solidification of oil in the actuator which may occur when the vehicle is parked for a long time in the cold, the throttle valve is positioned at the closed position in the subsequent engine idling operation. Therefore, the engine is not properly operated in the idling state.

SUMMARY OF THE INVENTION

The object of the present invention is to provide a system in which the throttle valve is rotated to a closed position when an ignition switch of the engine is turned off and the throttle valve is returned to an idling open position after a predetermined period, whereby reliable and smooth idling operation may be effected in the subsequent engine starting.

According to the present invention there is provided an engine speed control system for an internal combustion engine mounted on a vehicle, the engine having a carburetor with a throttle valve comprising an actuator for actuating said throttle valve; an engine speed signal generating circuit for producing an engine speed signal dependent on the engine speed; comparing circuit means for comparing the engine speed signal with a predetermined reference value and for producing engine speed control signals representing whether the level of the engine speed signal is higher than the predetermined reference value or not; an actuator control circuit for operating the actuator in opposite directions in accordance with the engine speed control signals; an ignition switch for producing an ignition turning off signal; a time lag circuit responsive to said ignition turning off signal to be effective to produce a time lag signal after a predetermined time; a first logic gate means for controlling the engine speed control signals; a vehicle speed signal generating circuit for generating a vehicle speed signal at a low speed of the vehicle; an idling signal generating circuit for generating an idling signal in the idling operation of the engine; a second logic gate means responsive to the ignition turning off signal effective to produce a signal which is applied to the actuator control cicruit; a third logic gate means responsive to the time lag signal effective to produce a signal which is applied to the actuator control circuit; the first logic gate means being so arranged as to be opened under the condition that the vehicle speed signal and the idling signal; the actuator control circuit being so arranged as to be responsive to the signal from the second logic gate means effective to close the throttle valve and to be responsive to the signal from the third logic gate means effective to open the throttle valve.

Other objects and features of the present invention will be fully descibed with reference to the accopanying drawings.

BRIEF DESCRIPTION OF THE DRAWINGS

FIG. 1 is a schematic diagram showing a system of the present invention;

FIG. 2 is a perspective view showing a carburetor and attachment thereof;

DETAILED DESCRIPTION OF THE PREFERRED EMBODIMENTS

Figure 3:
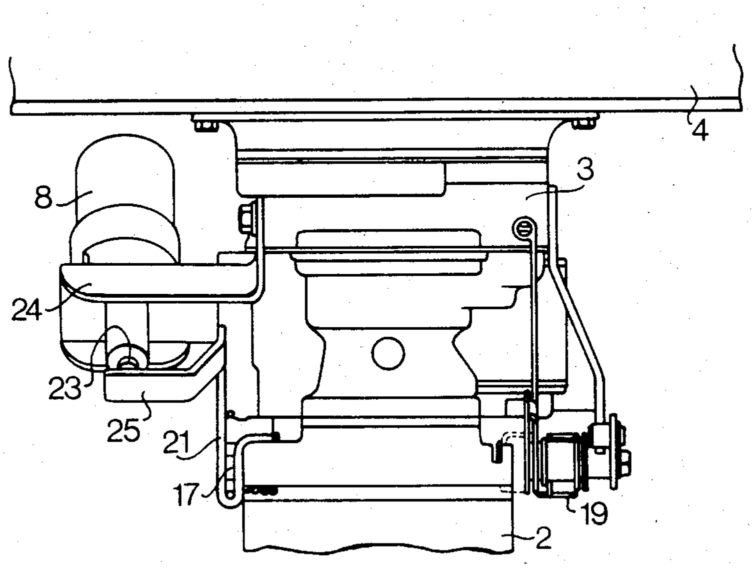
FIG. 3 is a front view of an actuator for the carburetor.

Referring to FIG. 1, an internal combustion engine 1 mounted on a vehicle (not shown itself) is provided with an intake manifold 2, a carburetor 3, an air cleaner 4, an ignition coil 5, and spark plugs 6 connected to the ignition coil 5, respectively. An actuator 8 for operating a throttle valve 18 (FIG. 2) in the carburetor is supported on the side wall of the carburetor 3. The actuator 8 includes an idling sensing switch 106 (see FIG. 8) which is hereinafter described. Idling signals produced by the idling sensing switch 106 in the actuator 8 are sent to a control circuit 10 by a lead 9. Pulses produced in synchronism with ignition pulses are also supplied to the control circuit 10 through a lead 11. The output of the control circuit 10 is connected to the actuator 8 by a lead 12.

A vehicle speed sensor 13 is connected to an axle of a front wheel 14 of the vehicle by a speedometer cable 15. The output of the vehicle speed sensor 13 is applied to the control circuit 10 by a lead 16.

Referring to FIG. 2, the throttle shaft 17 of a throttle valve 18 is rotatably supported in the carburetor 3, one end of the throttle shaft 17 being is secured to the inner end of a spring 19 which exerts a spring force on the throttle shaft 17 biasing the throttle valve 18 to close. A wire connector 20 and a lever 21 are secured to the throttle shaft 17 at the other side of the carburetor. An end of an accelerator wire 22 connected to an accelerator pedal (not shown) of the vehicle is fixed to the wire connector 20 and an end of a rod 23 of the actuator 8 is located adjacent to an end portion of the lever 21.

Figure 4:
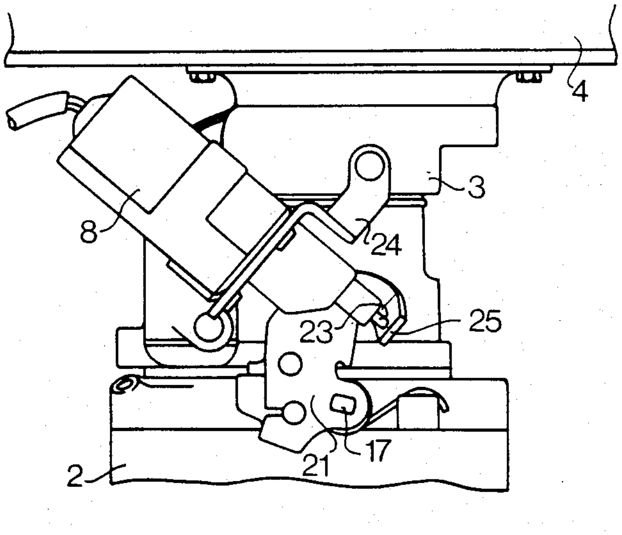
FIG. 4 is a side view of the actuator.

Referring to FIGS. 3 and 4, the actuator 8 is secured to a support 24 secured to the wall of the carburetor 3 and the end of the rod 23 is adjacent to a bent end portion 25 of the lever 21. The end of the rod 23 and the end portion 25 cooperates to act as the idling sensing switch as will be hereinafter described.

Figure 5:
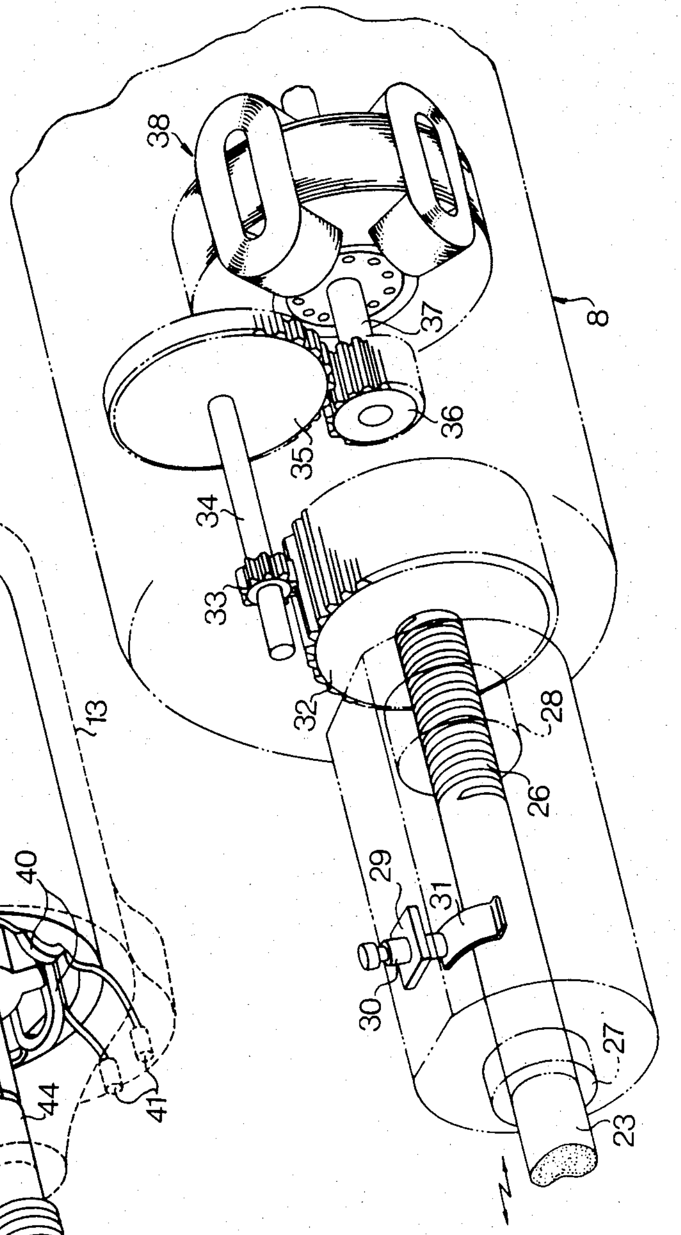
FIG. 5 is a perspective view showing the internal construction of the actuator.

FIG. 5 shows the internal construction of the actuator 8. The rod 23 is rotatably supported by a bearing 27. The rod 23 is formed with a thread 26 which is engaged with a female screw formed in a bearing 28. The rod 23 is secured to a gear 32. Although the rod is made of metal, the bearings 27, 28 and the gear 32 secured to the rod are made of plastic. Accordingly, the rod is insulated from the body 8 of the actuator. A terminal 30 is secured to the body of the actuator through an insulation plate 29. A brush 31 is secured to the terminal 30 and elastically engaged with the periphery of the rod 23.

The gear 32 engages with a pinion 33 securely mounted on a shaft 34, the end of which has a gear 35 securely mounted thereon. The gear 35 is engaged with a pinion 36 secured to a shaft 37 of a motor 38.

Figure 6:
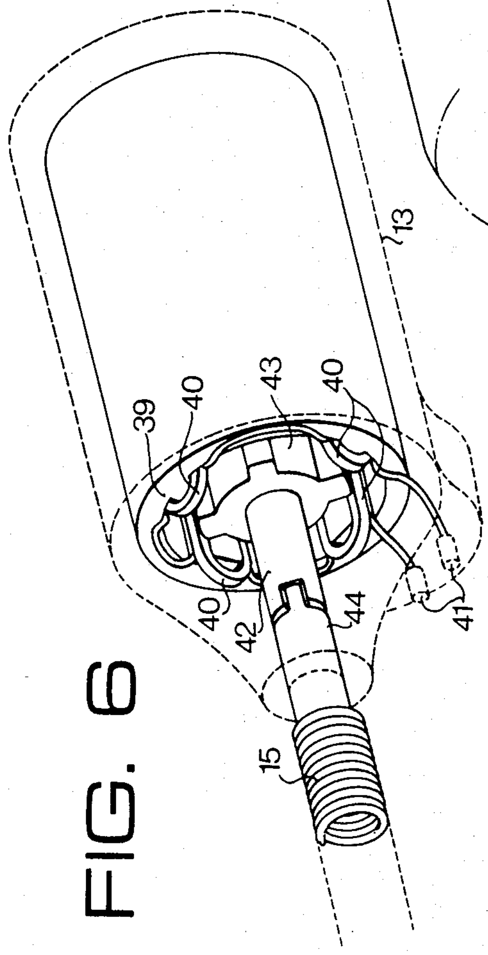
FIG. 6 is a perspective view showing a vehicle speed sensor.

Referring to FIG. 6, the vehicle speed sensor 13 comprises a cylindrical core 39 having coils 40 which are connected in series and connected to a pair of terminals 41. A rotor 43 is secured to a shaft 42 which is connected to a speedometer cable 15 through a joint 44. Thus, rotation of the rotor 43 produces an output voltage corresponding to the vehicle speed on terminals 41.

Figure 7:
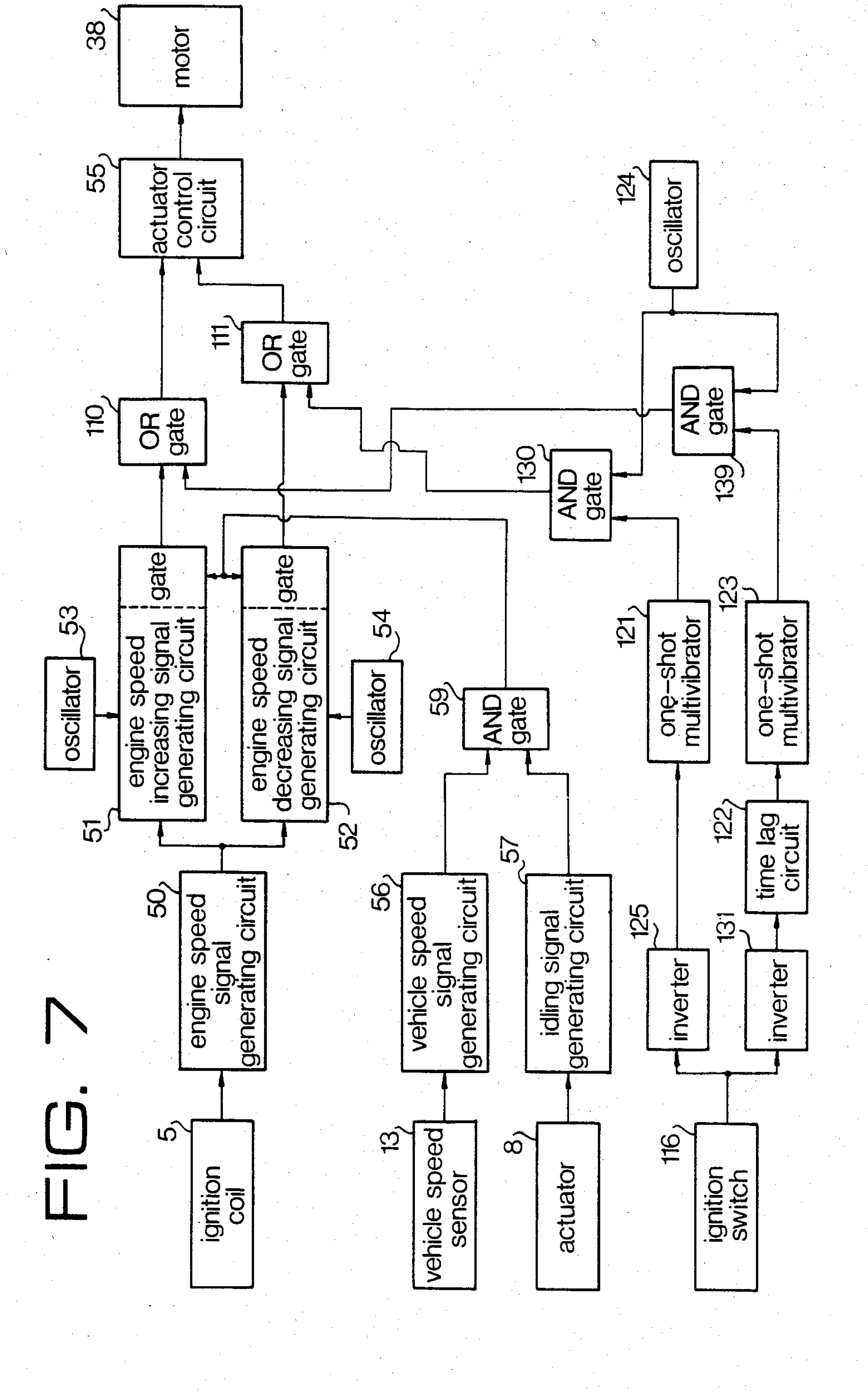
FIG. 7 is a block diagram of a control circuit employed in the system.
Figure 8:
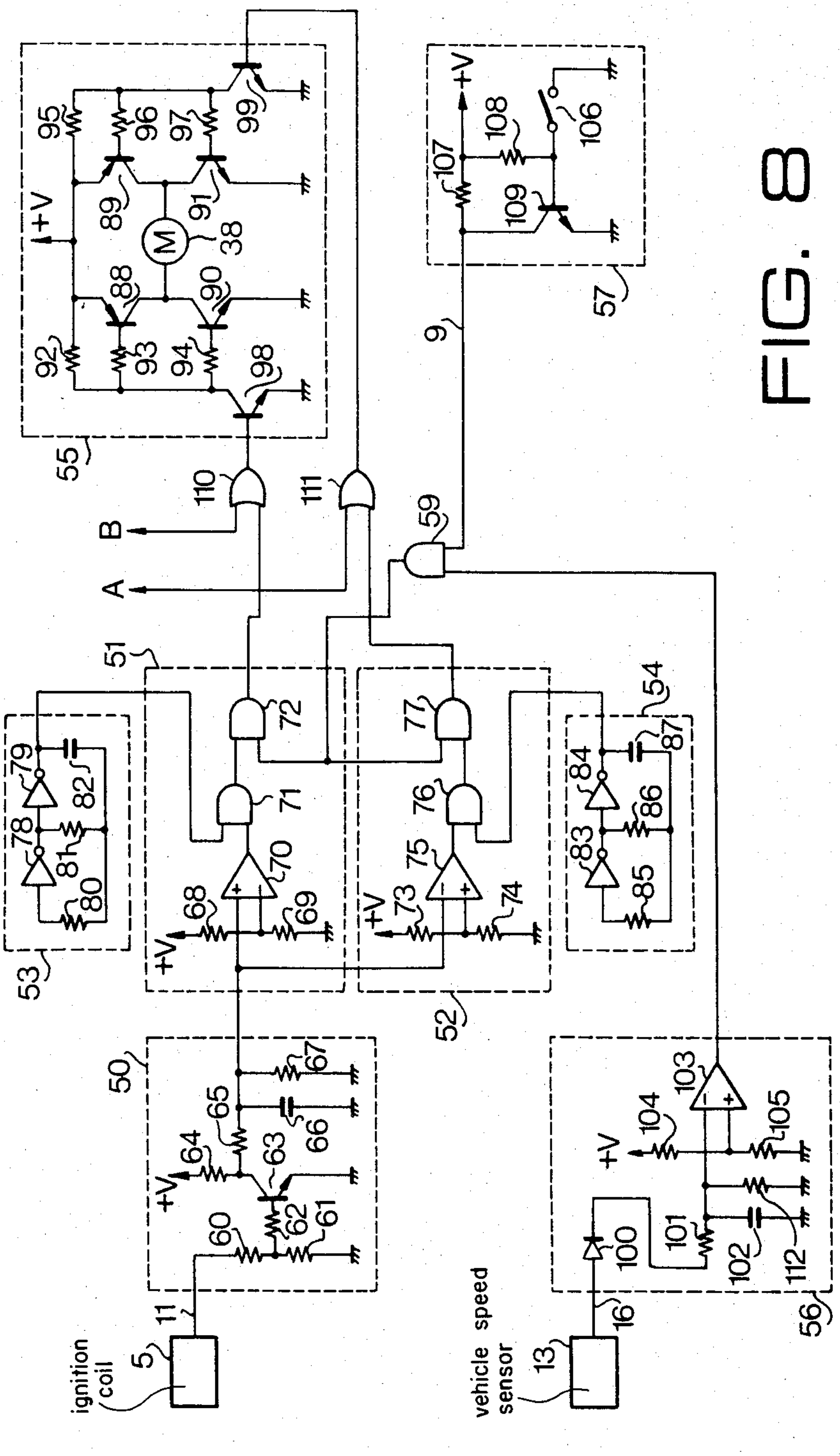
FIG. 8 is a electric circuit of the control circuit of FIG. 7.

Referring to FIGS. 7 and 8, the control circuit 10 generally includes an engine speed signal generating circuit 50, an engine speed increasing signal generating circuit 51, an engine speed decreasing signal generating circuit 52, oscillators 53 and 54, an actuator control circuit 55 for idling speed control, a vehicle speed signal generating circuit 56, an idling signal generating circuit 57, AND gates 59, 130, 139, inverters 125, 131, a time lag circuit 122, and one-shot multivibrators 121, 123.

Pulses from the ignition coil 5 are applied to the engine speed generating circuit 50. This causes the switching of a transistor switching circuit comprising resistors 60, 61, 62 and a transistor 63. The collector of the transistor 63 is connected to a positive supply through a resistor 64 and to an integrating circuit comprising resistors 65, 67 and a capacitor 66.

The output of the engine speed signal generating circuit 50 is connected to a noninverting input of a comparator 70 of the engine speed increasing signal generating circuit 51 and connected to an inverting input of a comparator 75 of the engine speed decreasing signal generating circuit 52. The inverting input of the comparator 70 is connected to a voltage divider comprising resistors 68 and 69 and the output thereof is connected to an AND gate 71. The output of the AND gate 71 is connected to an AND gate 72 for producing an engine speed increasing signal. The noninverting input of the comparator 75 is connected to a voltage divider comprising resistors 73 and 74, and the output thereof is connected to an AND gate 76. The output of the AND gate 76 is connected to an AND gate 77 for producing an engine speed decreasing signal. Oscillators 53 and 54 comprise inverters 78, 79, 83 and 84, resistors 80, 81, 85 and 86, and capacitors 82 and 87, respectively. Pulses from the oscillators 53 are applied to the AND gate 71 and pulses from the oscillator 54 are applied to the AND gate 76. AND gates 72 and 77 are applied with an output of the AND gate 59. The output of the AND gate 72 is connected an OR gate 110 and the output of the AND gate 77 is connected to an OR gate 111.

The actuator control circuit 55 for idling speed control has PNP transistors 88 and 89, NPN transistors 90 and 91 which are connected with each other in bridge form. The motor 38 is connected between collectors of two pairs of transistors. The actuator control circuit 55 further comprises a pair of transistors 98 and 99 and resistors 92 to 97 for applying voltages to each transistor. The base of the transistor 98 is applied with an output of the OR gate 110, and the base of the transistor 99 is applied with an output of the OR gate 111.

The output of vehicle speed sensor 13 is connected to a diode 100 of the vehicle speed signal generating circuit 56, which is in turn connected to an inverting input of comparator 103 through a resistor 101. A capacitor 102 and resistor 112 are also connected to the inverting input of the comparator. The noninverting input of the comparator 103 is connected to a voltage divider comprising resistors 104 and 105. The output of the comparator 103 is connected to one of the inputs of the AND gate 59.

The idling signal generating circuit 57 senses operative engagement of the rod 23 with the throttle. It includes an idling sensing switch 106 which is formed by the end of the rod 23 and the end portion 25 of the lever 21. An end of the switch 106 is grounded and the other end is connected to the supply through a resistor 108 and to a basa of a transistor 109. The collector of the transistor 109 is connected to the supply through a resistor 107 and to input of AND gate 59.

Figure 9:
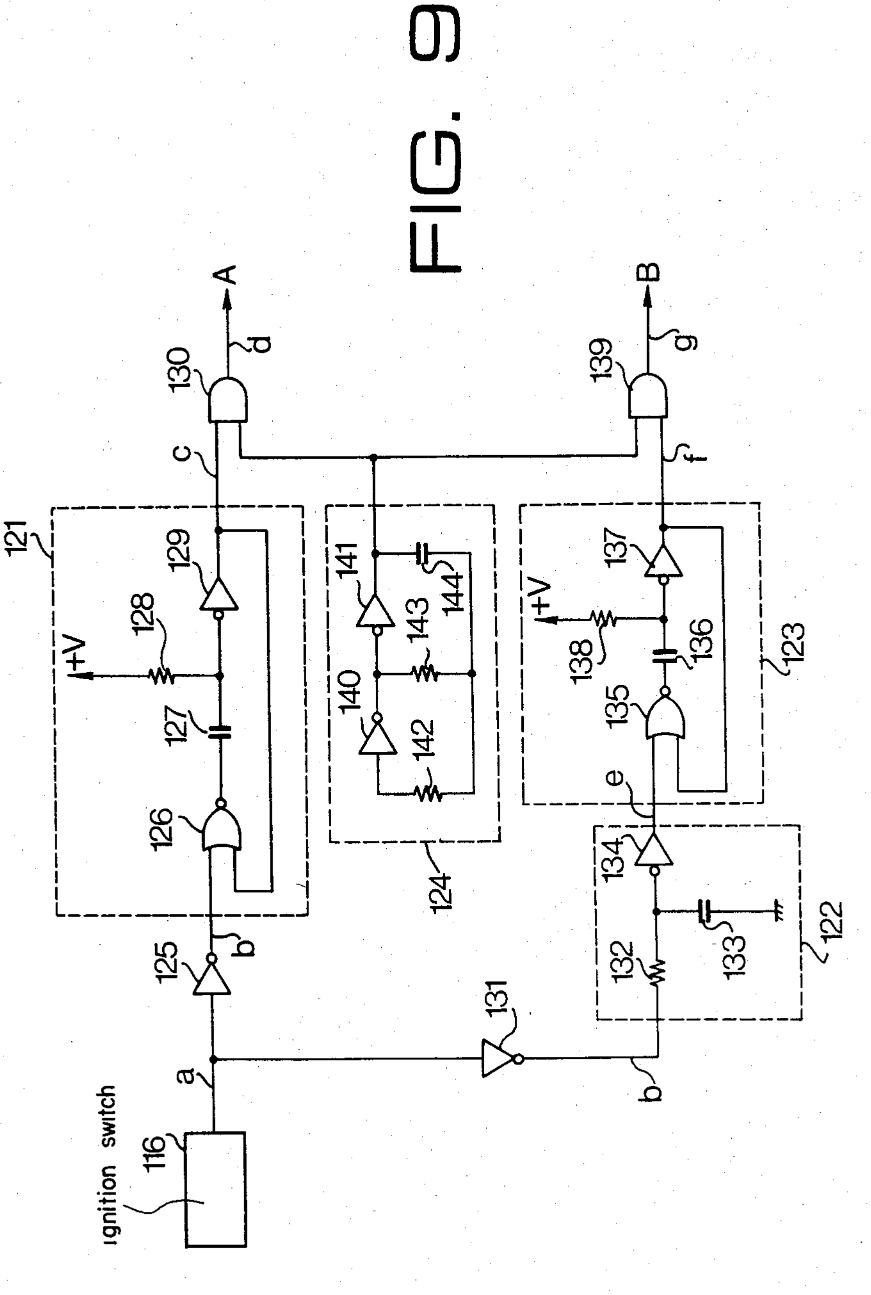
FIG. 9 is an electric circuit for an essential part of the system.

Referring to FIG. 9, an output of an ignition switch 116 is connected to a NOR gate 126 through an inverter 125, the output of the NOR gate is in turn connected to an inverter 129 through a capacitor 127. Positive voltage is applied to the inverter 129 through a resistor 128. Thus, the one-shot multivibrator 121 is provided. The output of the inverter 129 is applied to an AND gate 130 to provide a rod retracting signal A. The output of the AND gate 130 is connected to the OR gate 111.

On the other hand, the output of the ignition switch 116 is connected to a resistor 132 of the time lag circuit 122 through an inverter 131. The other end of the resistor 132 is connected to a capacitor 133 and to a buffer 134, the output of which is connected to a NOR gate 135 of the one-shot multivibrator 123. The one-shot multivibrator 123 comprises the NOR gate 135, a capacitor 136, inverter 137, and resistor 138. The output of the one-shot multivibrator 123 is connected to an AND gate 139 to produce a rod projecting signal B. The output of the AND gate 139 is connected to the OR gate 110. An oscillator 124 comprises inverters 140, 141, resistors 142, 143 and capacitor 144, output of which is connected to AND gates 130 and 139.

In operation, pulses proportional to ignition pulses are applied to the engine speed generating circuit 50. Rotation of the front wheel 14 causes the rotor 43 of the vehicle speed sensor 13 to rotate to generate output (alternating current) in proportion to the vehicle speed on terminals 41 (FIG. 6). As to the idling sensing switch 106, if the accelerator pedal is depressed for the acceleration of the engine, the end portion 25 of the lever 21 secured to the throttle shaft 17 is disengaged from the end of the rod 23, which means opening of the idling sensing switch 106.

Pulses applied to the engine speed signal generating circuit 50 turns the transistor 63 on and off. The voltage on the end of the capacitor 66 varies in inverse proportion to the engine speed. The voltage at the capacitor 66 is applied to comparators 70 and 75. When the input voltage from capacitor 66 to the non-inverting input of the comparator 70 is higher than the lower limit reference voltage at the inverting input (indicating low engine speed), a high level output signal is applied to the AND gate 71. The AND gate 71 produces pulses according to the input pulses from the oscillator 53, which are applied to the AND gate 72. When the input voltage from capacitor 66 to the inverting input of the comparator 75 decreases below the upper limit reference voltage at its non-inverting input (indicating that the engine speed has become high) a high level output signal is applied to the AND gate 76. The AND gate 76 produces pulses which are applied to the AND gate 77 similarly to the operation of the AND gate 71.

Figure 10:
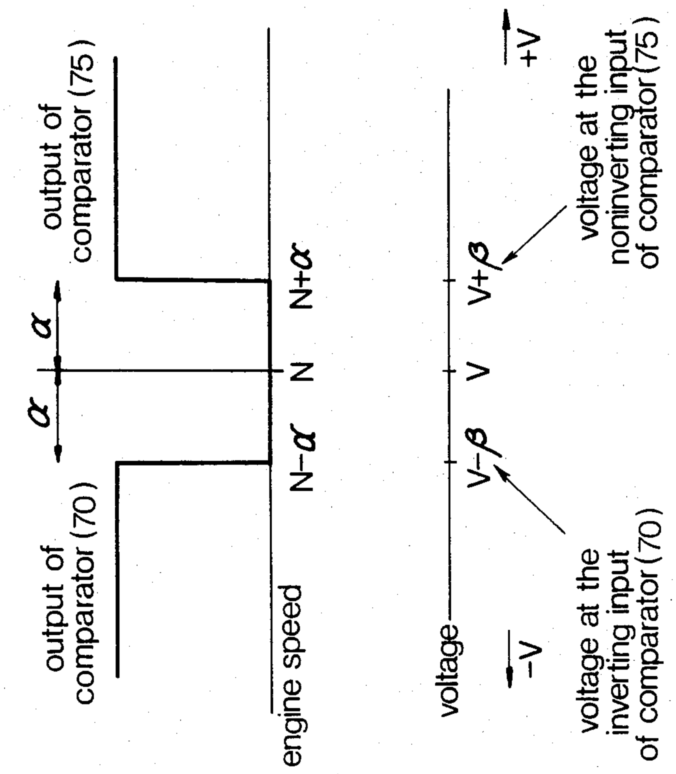
FIG. 10 is a graph showing outputs of comparators in the control circuit.

Referring to FIG. 10, $V-\beta$ is the lower limit reference voltage at the inverting input of the comparator 70 and $V+\beta$ is the higher limit reference voltage at the noninverting input of the comparator 75. Therefore, the comparator 70 produces the high level output at the engine speed $N-\alpha$ corresponding to the voltage $V-\beta$ and the comparator 75 produces the output at the engine speed $N+\alpha$ corresponding to the voltage $V+\beta$. Accordingly, there is provided a non-operation zone $\pm\alpha$ on both sides of a desired idling speed N.

The vehicle speed signal from the vehicle speed sensor 13 is applied to the comparator 103 through the diode 100. When the vehicle speed signal exceeds a predetermined level of the input signal at the noninverting signal of the comparator 103, output of the comparator 103 changes from a high level to a low level. The changing of the output is made at a low vehicle speed, for example at 8 Km/h.

When the idling sensing switch 106 is off, that is the level 21, is disengaged from the rod 23, the transistor 109 is turned on, so that the idling signal on the lead 9 is at a low level. However, if the idling sensing switch 106 is on, the transistor 109 is turned off, so that the idling signal goes to a high levelever, if the idling sensing switch 106 is on, the transistor 109 is turned off, so that the idling signal goes to a high level.

It will be seen that AND gates 72 and 77 produce a high level output when the input applied from the AND gate 59 is at a high level and that the AND gate 59 produces a high level output when all inputs applied from the vehicle speed signal generating circuit 56 and idling signal generating circuit 57 are at high levels. The conditions are as follows:

(A) Vehicle speed is lower than a predetermined speed:

(B) The lever 21 engages the end of the rod 23 (idling state).

Under these conditions, the AND gate 59 produces a high level output to open AND gates 72 and 77 for controlling idling speed.

When engine idling speed is lower than the speed $N-\alpha$ (FIG. 10), the comparator 70 produces a high level output which actuates the AND gate 71 to produce pulses. The pulses are applied to the base of the transistor 98 through the AND gate 72 to periodically turn on the transistor. As a result, the transistors 88 and 91 are turned on, so that current passes through the transistor 88, motor 38, and transistor 91, which causes the rotation of the motor 38 in one direction. The rotation of the motor is transmitted to the rod 23 through the gears 36, 35, 33 and 32, so that the rod 23 is projected to push the lever 21. Thus, the throttle valve 18 is rotated to open the induction passage to increase the engine idling speed.

When the engine idling speed exceeds the speed $N+\alpha$, the comparator 75 produces a high level output, so that the transistor 99 is turned on in a similar manner to the circuit 51. Thus, transistors 88 and 90 are turned on and the motor 38 is caused the reverse rotation, so that the rod 23 is retracted. The throttle valve 18 is rotated by the spring 19 to close the passage to decrease engine idling speed. Thus, the engine idling speed is automatically maintained to the desired idling speed N.

The conditions under which the above-described speed control is not operative are as follows:

(C) Vehicle speed is higher than a predetermined value and the output of the circuit 56 changes to a low level:

(D) Throttle valve is opened, and the idling sensing switch 106 is turned off, so that the idling signal goes to a low level.

Under one of these conditions, the output of the AND gate 59 goes to a low level thereby stopping the motor control operation.

Describing operation for stopping the engine operation, when the ignition switch 116 is turned off, the output (reference a in FIG. 11) thereof changes from a high level to a low level, causing the output of inverter 125 (b in FIG. 11) to go to a high level.

Figure 11:
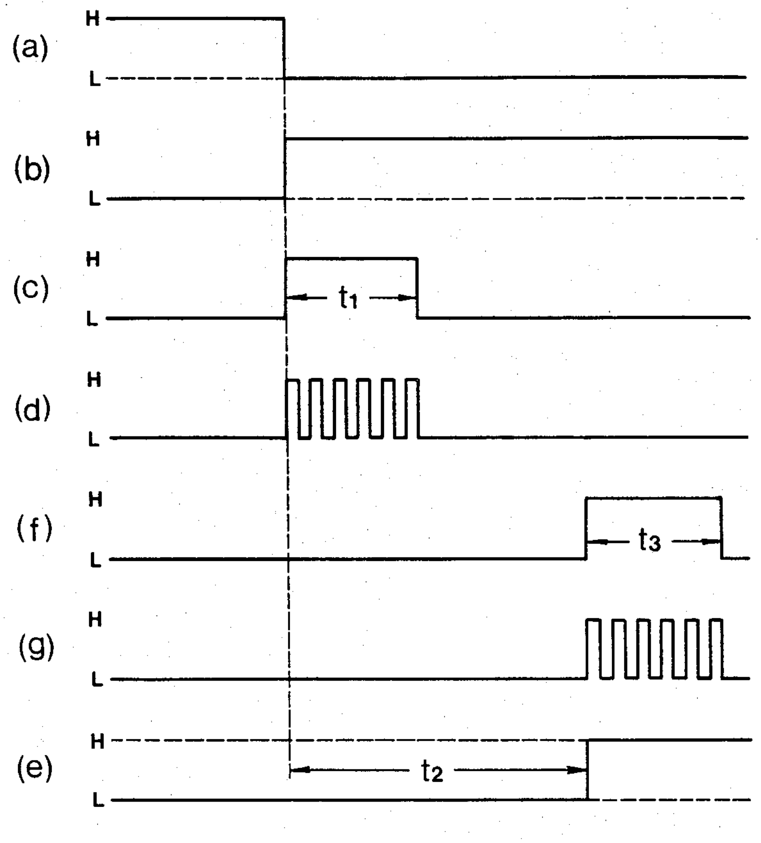
FIG. 11 shows waveforms at various positons of FIG. 9.

The high level output of the output b operates the oneshot multivibrator 121 to produce an output c for a predetermined time $t_1$ (FIG. 11). Thus, the AND gate 130 is opened to produce pulses (d) as the rod retracting signal A in accordance with the pulses applied from the oscillator 124. The rod retracting signal A is applied to the transistor 99 through the OR gate 111. Thus, the motor 38 is rotated in the reverse direction to retract the rod 23. Thus, the throttle valve is further rotated from the idling open position by the spring 19 at a low speed. When the throttle valve reaches the closing position, the throttle valve is stopped by a stopper (not shown) causing the engine to stop. Thus, the running on of the engine can be prevented.

On the other hand, the output b of the inverter 131 also goes to a high level which actuates the time lag circuit 122. The voltage at the capacitor 133 gradually increases. When the voltage reaches a predetermined level after a predetermined time $t_2$, the output e of the buffer goes to a high level. The time $t_2$ dependent on the time constant of RC is selected, so that the output e may go to the high level after the engine stops. For example, the time $t_2$ is ten seconds after the producing of the rod retracting signal A.

When the output e changes to a high level, the oneshot multivibrator 123 produces an output f for a predetermined time $t_3$ to open the AND gate 139. Thus, the AND gate 139 produces pulses g as the rod projecting signal B. The signal B is applied to the transistor 98 through the OR gate 110, so that the motor 38 rotates to project the rod 23 for the time $t_3$. The throttle valve is rotated by the projection of the rod and is located in the idling open position.

From the foregoing, it will be understood that the running on of the engine after the ignition off can be prevented by positioning the throttle valve in the closed position and thereafter the throttle valve is returned to the idling open position, whereby idling speed control operation may be smoothly and reliably performed in the subsequent engine operation.

What is claimed is:

1. In an actuator control system for an engine idling speed governor of an internal combustion engine mounted on a vehicle having an ignition switch including a closed position and an open position, means for producing ignition pulses, actuator means for actuating a throttle valve in an induction passage of the engine, and a spring arranged to bias said throttle valve in the closing direction, the improvement of the system comprising:

means responsive to said ignition pulses for producing an engine speed signal have a magnitude corresponding to said ignition pulses;

means comprising a vehicle speed sensor for producing an output voltage having a magnitude associated with the speed of the vehicle;

means comprising an idling signal generating circuit for producing an idling signal, indicating idling operation of said engine;

means comprising a vehicle speed signal generating circuit for producing a first logic signal when the magnitude of the output voltage of the vehicle speed sensor is lower than a predetermined value related with a corresponding vehicle speed;

first signal generating circuit means responsive to said engine speed signal, said first logic signal and said idling signal for producing an engine speed increasing signal when the magnitudes of said engine speed signal is higher than a lower limit magnitude related with an engine speed, and when said first logic signal and said idling signal are activated;

second signal generating circuit means responsive to said engine speed signal, said first logic signal and said idling signal for producing an engine speed decreasing signal when the magnitude of said engine speed signal is lower than an upper limit magnitude related with a second engine speed, and when said first logic signal and said idling signal are activated; and means comprising an actuator control circuit operatively connected to said actuator means and responsive to said engine speed increasing signal for opening the throttle valve to increase idling speed, and responsive to said engine speed decreasing signal for closing the throttle valve to decrease idling speed.

2. An engine speed control system according to claim 1 wherein said actuator means comprises:

an electric motor; and an axially movable rod;

said actuator control circuit being responsive to said engine speed increasing signal to project said rod, and responsive to said engine speed decreasing signal to retract said rod.

3. The system according to claim 1, further comprising ignition switch detecting means for producing an ignition switch logic signal when the ignition switch changes from said closed position to said open position;

time lag circuit means connected to said ignition switch detecting means and responsive to said ignition switch logic signal for producing a time lag logic signal a predetermined time after the activation of said ignition switch logic signal;

one shot multivibrator means operatively connected to said actuator control circuit and responsive to said ignition switch logic signal to close the throttle valve, and responsive to said time lag logic signal to open the throttle valve to an idling position.

4. An actuator control system for an engine idling speed governor for an internal combustion engine mounted on a vehicle, said engine having an induction passage and a throttle valve in said induction passage, comprising:

an actuator having a moveable rod engageable with said throttle valve for actuating said valve;

a spring arranged to bias said throttle valve to follow said rod of the actuator for closing the induction passage;

means comprising an engine speed signal generating circuit for producing an engine speed signal dependent on engine speed;

comparing circuit means operatively connected to said engine speed signal generating circuit for comparing said engine speed signal with a reference valve corresponding to a predetermined idling speed and for generating an engine speed increasing signal and an engine speed decreasing signal respectively;

means comprising an actuator control circuit connected to said comparing circuit means and having a first circuit responsive to said engine speed increasing signal for operating said actuator in a throttle valve opening direction and a second circuit responsive to said engine speed decreasing signal for operating said actuator in a throttle valve closing direction;

ignition switch means for producing a first signal having a first logic level when said ignition switch means is activated for engine operation and for producing a second signal having the other logic level when said ignition switch means is deactivated;

an idling signal generating circuit including means for sensing engagement of said rod with said throttle and means responsive to said sensing means for generating an idling signal indicating idling operation of said engine during engagement of said rod with said throttle;

means for generating an operating signal for operating said actuator control circuit;

means comprising a time lag circuit responsive to activation of said second signal of said ignition switch means for producing a time lag signal at a predetermined time after activation of said second signal;

first logic gate means responsive to said idling signal for applying said engine speed increasing and decreasing signals to said actuator control circuit;

second logic means responsive to said second signal and to said operating signal for producing a signal which is applied to said second circuit of said actuator control circuit, said second circuit being responsive to said second logic gate signal for moving said throttle valve from an idling position to a closed position;

third logic means responsive to said time lag circuit and to said operating signal to produce a signal which is applied to said first circuit of said actuator control circuit; said first circuit being responsive to said third logic gate signal for opening said throttle valve to said idling position.

5. The actuator control system for an engine idling speed governor according to claim 4, wherein said operating signal means is an oscillator.

* * * * *